US011372986B1

(12) United States Patent
Doherty et al.

(10) Patent No.: US 11,372,986 B1
(45) Date of Patent: Jun. 28, 2022

(54) SYSTEMS AND METHODS FOR ENCRYPTED CONTENT MANAGEMENT

(71) Applicant: Axiom Technologies LLC, Reston, VA (US)

(72) Inventors: Maxwell Doherty, Reston, VA (US); Jonathan Graham, Triangle, VA (US)

(73) Assignee: Axiom Technologies LLC, Reston, VA (US)

( * ) Notice: Subject to any disclaimer, the term of this patent is extended or adjusted under 35 U.S.C. 154(b) by 14 days.

(21) Appl. No.: 17/151,391

(22) Filed: Jan. 18, 2021

(51) Int. Cl.
*G06F 21/62* (2013.01)
*H04L 9/08* (2006.01)
*H04L 9/06* (2006.01)
*H04L 9/30* (2006.01)
*H04L 9/40* (2022.01)

(52) U.S. Cl.
CPC .............. *G06F 21/62* (2013.01); *H04L 9/065* (2013.01); *H04L 9/088* (2013.01); *H04L 9/30* (2013.01); *H04L 63/0435* (2013.01)

(58) Field of Classification Search
CPC ...................................................... G06F 21/62
See application file for complete search history.

(56) References Cited

U.S. PATENT DOCUMENTS

| 4,200,770 | A | 4/1980 | Hellman et al. |
| 5,142,578 | A | 8/1992 | Matyas et al. |
| 5,200,999 | A | 4/1993 | Matyas et al. |
| 5,204,901 | A | 4/1993 | Hershey et al. |
| 5,265,164 | A | 11/1993 | Matyas et al. |
| 5,481,613 | A | 1/1996 | Ford et al. |
| 5,799,086 | A | 8/1998 | Sudia |
| 5,850,443 | A | 12/1998 | Van Oorschot et al. |
| 7,469,263 | B2 * | 12/2008 | Higashiura ............. G06F 16/21 |
| 8,031,865 | B2 | 10/2011 | Stedron |
| 10,579,793 | B2 | 3/2020 | Lerner |
| 11,190,358 | B2 | 11/2021 | Bettger |

(Continued)

FOREIGN PATENT DOCUMENTS

WO  WO-2015195978 A1  12/2015

OTHER PUBLICATIONS

International Search Report and Written Opinion of the International Searching Authority regarding International Patent Application No. PCT/US2021/055390, dated Jan. 28, 2022.

*Primary Examiner* — Bradley W Holder
(74) *Attorney, Agent, or Firm* — Harness, Dickey & Pierce, P.L.C.

(57) ABSTRACT

Systems and methods for encrypted content management are provided and include generating an asymmetric key pair for a user, including a user private key and a user public key. A symmetric encryption key is generated based on unique information known to the user. The user private key is encrypted using the symmetric encryption key to generate a user escrow key. Plaintext data is encrypted into ciphertext data using a content symmetric key and stored in a data storage unit. An ephemeral pair of keys is generated and includes an ephemeral public key and an ephemeral private key. A shared-secret key is generated based on the ephemeral private key and the user public key using a diffie-hellman exchange algorithm and the content symmetric key is encrypted using the shared-secret key. The encrypted content symmetric key and the ephemeral public key are stored in an encrypted content management storage unit.

10 Claims, 10 Drawing Sheets

(56) References Cited

U.S. PATENT DOCUMENTS

| | | |
|---|---|---|
| 2005/0069137 A1 | 3/2005 | Landrock |
| 2005/0091491 A1* | 4/2005 | Lee ..................... H04L 9/0825 |
| 2009/0136041 A1* | 5/2009 | Tsu ........................ G06F 21/84 |
| | | 380/278 |
| 2010/0174910 A1 | 7/2010 | Little |
| 2010/0325732 A1 | 12/2010 | Mittal et al. |
| 2011/0064216 A1 | 3/2011 | Naccache et al. |
| 2011/0252234 A1 | 10/2011 | De Atley et al. |
| 2011/0252243 A1 | 10/2011 | Brouwer et al. |
| 2015/0220754 A1* | 8/2015 | Avery ................ G06F 21/6218 |
| | | 713/193 |
| 2018/0331829 A1 | 11/2018 | Wang et al. |

* cited by examiner

User Key Creation Process

Content Encryption Process (User)

FIG. 6  Content Decryption Process (User)

Group Key Creation Process

Content Encryption Process (Group)

Content Decryption Process (Group)

Content Decryption Process (Group)
(continued)

SYSTEMS AND METHODS FOR ENCRYPTED CONTENT MANAGEMENT

FIELD

The present disclosure relates to systems and methods for encrypted content management, including systems and methods that provide cryptographic key management.

BACKGROUND

This section provides background information related to the present disclosure which is not necessarily prior art.

Traditional information systems accomplish security by authenticating users and processes and then allowing or denying access to internal network resources based on the authentication result. This approach allows internal network resources to trust one another in addition to authenticated external users. These trust relationships, however, can be exploited. Once the network perimeter is breached by an unauthorized user, all internal data can be compromised, accessed, and modified.

Digital data generally exists in one of three states: an at-rest state, an in-process state, and an in-transit state. For example, data stored in an offline storage unit is in the at-rest state. Data currently being processed, modified, or updated is in the in-process state. Data being communicated, such as across a network or between internal nodes of a system, is in the in-transit state. Data protection within a network can consist of an ensemble of cybersecurity technologies that include encryption. Encryption technologies provide data confidentiality and data integrity. Traditional encryption systems encrypt data in the at-rest and/or in-transit states. Encrypting data in only one or two of the data states, however, can leave the data vulnerable to compromise when it is not in an encrypted state, which is most of the time in traditional encryption systems. In such systems, this vulnerability is in addition to other vulnerabilities to the encrypted data due to trust relationships and the specific encryption implementation. Encryption technologies require a secure cryptographic key management solution to assure the implementation of encryption processes.

Current systems protect data in the in-transit state by providing or utilizing transport layer security (TLS), virtual private networks (VPN), and/or secure shell (SSH). TLS systems secure communication over a distributed communications network using public key infrastructure (PKI). For example, a TLS system can encrypt application layer data that is segmented at the transport layer of the transmission control protocol/Internet protocol (TCP/IP) model of network communication. TLS is commonly used to secure hypertext transfer protocol (HTTP) web application layer communication traffic. VPN systems can secure/encrypt network traffic, but are generally used for extending a private network boundary securely over an unsecure/untrusted distributed communications network, such as the Internet. SSH is a cryptographic network protocol for operating network services over an unsecure/untrusted communications network. For example, SSH systems can provide a secure channel over an unsecured network by using a client-server architecture that connects an SSH client application with an SSH server. Systems utilizing these technologies ensure that data between two parties is encrypted while transiting an untrusted network such as the Internet. These in-transit protections, however, end at the terminating points of the connection and leave data vulnerable to the malicious access through internal and trusted network resources after termination. In addition, systems that rely on PKI for protection are reliant on an external entity, such as a certificate authority, that generates, issues, and maintains the certificates. Malicious actors can steal keys and/or issue forged keys ultimately resulting in the defeat or degradation of the encryption system or protocol being used.

Systems that provide encryption for data in the at-rest state provide confidentiality of data while the data is being stored in a storage system, such as a hard disk, flash, memory, database, etc. Current encryption systems for data in the at-rest state are implemented such that when the data is being stored in the storage medium, it can only be decrypted with the appropriate encryption key(s). These systems vary, however, with respect to how they are implemented and can provide attack surfaces from a range of trusted entities and resources. In addition, data is rarely actually in the at-rest state as databases and hard disks are in an unlocked/decrypted state most of the time.

Data in the in-process state is not generally protected by these systems or technologies. In other words, current encryption systems only protect data in the at-rest and in-transit states, leaving data vulnerable while in the in-process state, in addition to vulnerabilities created by segmented, single, or two-stage encryption approaches.

SUMMARY

This section provides a general summary of the disclosure, and is not a comprehensive disclosure of its full scope or all of its features.

The present disclosure includes a method comprising generating, with a client module, an asymmetric key pair for a user, including a user private key and a user public key. The method also includes generating, with the client module, a symmetric encryption key for the user, the symmetric encryption key being generated based on unique information known to the user. The method also includes encrypting, with the client module, the user private key using the symmetric encryption key to generate a user escrow key. The method also includes transmitting, with the client module, the user public key and the user escrow key to an encrypted content management module over a network, the encrypted content management module storing the user public key and the user escrow key in an encrypted content management storage unit. The method also includes encrypting, with a client module, plaintext data into ciphertext data using a content symmetric key. The method also includes storing, with the client module, the ciphertext data in a data storage unit. The method also includes generating, with the client module, an ephemeral pair of keys including an ephemeral public key and an ephemeral private key. The method also includes receiving, with the client module, the user public key from the encrypted content management module. The method also includes generating, with the client module, a shared-secret key based on the ephemeral private key and the user public key using a diffie-hellman exchange algorithm. The method also includes encrypting, with the client module, the content symmetric key using the shared-secret key. The method also includes communicating, with the client module, the encrypted content symmetric key and the ephemeral public key to the encrypted content management module, the encrypted content management module storing the encrypted content symmetric key and the ephemeral public key in the encrypted content management storage unit.

In other features, the method includes requesting and receiving, with the client module, the user escrow key from the encrypted content management module. The method also includes generating, with the client module, the symmetric encryption key based on the unique information known only to the user. The method also includes decrypting, with the client module, the user escrow key with the symmetric encryption key to obtain the user private key. The method also includes requesting and receiving, with the client module, the ephemeral public key from the encrypted content management module. The method also includes generating, with the client module, the shared-secret key based on the ephemeral public key and the user private key using the diffie-hellman exchange algorithm. The method also includes requesting and receiving, with the client module, the encrypted content symmetric key from the encrypted content management module. The method also includes decrypting the encrypted content symmetric key using the shared-secret key. The method also includes retrieving the ciphertext data from the data storage unit. The method also includes decrypting the ciphertext data using the decrypted content symmetric key to obtain the plaintext data.

In other features, the unique information known to the user is a password.

In other features, the unique information known to the user is stored on cryptographic hardware that is in the possession of the user.

In other features, the cryptographic hardware is at least one of a smart card and a hardware token.

In other features, the plaintext data is encrypted into a plurality of different encrypted ciphertext versions of the plaintext data and the plurality of different encrypted ciphertext versions are stored in the data storage unit, each of the different encrypted ciphertext versions of the plaintext data being configured for decryption by a different decrypted content symmetric key associated with a different user.

In other features, code for the client module is communicated over the network to an application module in communication with the data storage unit.

In other features, the code for the client module and the client module are each secured and protected from modification by the application module.

In other features, the unique information known to the user is provided directly to the client module without being received by the application module.

In other features, the method further includes displaying, with the client module, the plaintext data after the ciphertext data is decrypted into the plaintext data on a display device and prohibiting access to the plaintext data by the application module.

In other features, the encrypted content management module is configured such that access to the encrypted content management storage unit can be revoked.

The present disclosure also includes a system comprising a client module configured to generate an asymmetric key pair for a user, including a user private key and a user public key. The client module is further configured to generate a symmetric encryption key for the user, the symmetric encryption key being generated based on unique information known to the user. The client module is further configured to encrypt the user private key using the symmetric encryption key to generate a user escrow key. The client module is further configured to transmit the user public key and the user escrow key to an encrypted content management module over a network, the encrypted content management module storing the user public key and the user escrow key in an encrypted content management storage unit. The client module is further configured to encrypt plaintext data into ciphertext data using a content symmetric key. The client module is further configured to store the ciphertext data in a data storage unit. The client module is further configured to generate an ephemeral pair of keys including an ephemeral public key and an ephemeral private key. The client module is further configured to receive the user public key from the encrypted content management storage unit. The client module is further configured to generate a shared-secret key based on the ephemeral private key and the user public key using a diffie-hellman exchange algorithm. The client module is further configured to encrypt the content symmetric key using the shared-secret key. The client module is further configured to communicate the encrypted content symmetric key and the ephemeral public key to the encrypted content management module, the encrypted content management module storing the encrypted content symmetric key and the ephemeral public key in the encrypted content management storage unit.

In other features, the client module is further configured to request and receiver the user escrow key from the encrypted content management storage unit. In other features, the client module is further configured to generate the symmetric encryption key based on the unique information known to the user. In other features, the client module is further configured to decrypt the user escrow key with the symmetric encryption key to obtain the user private key. In other features, the client module is further configured to request and receive the ephemeral public key and the encrypted content symmetric key from the encrypted content management storage unit. In other features, the client module is further configured to generate the shared-secret key based on the ephemeral public key and the user private key using the diffie-hellman exchange algorithm. In other features, the client module is further configured to decrypt the encrypted content symmetric key using the shared-secret key. In other features, the client module is further configured to retrieve the ciphertext data from the data storage unit. In other features, the client module is further configured to decrypt the ciphertext data using the decrypted content symmetric key to obtain the plaintext data.

In other features, the unique information known to the user is a password.

In other features, the unique information known to the user is stored on cryptographic hardware that is in the possession of the user.

In other features, the cryptographic hardware is at least one of a smart card and a hardware token.

In other features, the plaintext data is encrypted into a plurality of different encrypted ciphertext versions of the plaintext data and the plurality of different encrypted ciphertext versions are stored in the data storage unit, each of the different encrypted ciphertext versions of the plaintext data being configured for decryption by a different decrypted content symmetric key associated with a different user.

In other features, code for the client module is communicated over the network to an application module in communication with the data storage unit.

In other features, the code for the client module and the client module are each secured and protected from modification by the application module.

In other features, the unique information known to the user is provided directly to the client module without being received by the application module.

In other features, the client module is further configured to display the plaintext data after the ciphertext data is decrypted into the plaintext data on a display device and prohibiting access to the plaintext data by the application module.

In other features, the encrypted content management module is configured such that access to the encrypted content management storage unit can be revoked.

The present disclosure also includes a method comprising generating, with a client module, an asymmetric key pair for a user, including a user private key and a user public key. The method also includes generating, with the client module, a symmetric encryption key for the user, the symmetric encryption key being generated based on unique information known to the user. The method also includes encrypting, with the client module, the user private key using the symmetric encryption key to generate a user escrow key. The method also includes transmitting, with the client module, the user public key and the user escrow key to an encrypted content management module over a network, the encrypted content management module storing the user public key and the user escrow key in an encrypted content management storage unit. The method also includes generating, with the client module, a group asymmetric key pair including a group private key and a group public key. The method also includes generating, with the client module, a group symmetric encryption key. The method also includes encrypting, with the client module, the group private key with the group symmetric encryption key. The method also includes generating, with the client module, a first shared-secret key based on the user public key and the group private key using a diffie-hellman exchange algorithm. The method also includes encrypting, with the client module, the group symmetric encryption key using the first shared-secret key to generate an escrow key. The method also includes communicating, with the client module, the group public key, the encrypted group private key, and the escrow key to the encrypted content management module, the encrypted content management module storing the group public key, the encrypted group private key, and the escrow key in the encrypted content management storage unit. The method also includes encrypting, with the client module, plaintext data into ciphertext data using a content symmetric key. The method also includes storing, with the client module, the ciphertext data in a data storage unit. The method also includes generating, with the client module, an ephemeral pair of keys including an ephemeral public key and an ephemeral private key. The method also includes receiving, with the client module, the group public key from the encrypted content management module. The method also includes generating, with the client module, a second shared-secret key based on the ephemeral private key and the group public key using a diffie-hellman exchange algorithm. The method also includes encrypting, with the client module, the content symmetric key using the second shared-secret key. The method also includes communicating, with the client module, the encrypted content symmetric key and the ephemeral public key to the encrypted content management module, the encrypted content management module storing the encrypted content symmetric key and the ephemeral public key in the encrypted content management storage unit.

In other features, the method further includes requesting and receiving, with the client module, the user escrow key from the encrypted content management module. The method also includes generating, with the client module, the symmetric encryption key based on the unique information known to the user. The method also includes decrypting, with the client module, the user escrow key with the symmetric encryption key to obtain the user private key. The method also includes requesting and receiving, with the client module, the group public key from the encrypted content management module. The method also includes generating, with the client module, the first shared-secret key based on the user private key and the group public key. The method also includes requesting and receiving, with the client module, the escrow key from the encrypted content management module. The method also includes decrypting, with the client module, the escrow key using the first shared-secret key to recover the group symmetric encryption key. The method also includes requesting and receiving, with the client module, the encrypted group private key from the encrypted content management module. The method also includes decrypting, with the client module, the encrypted group private key using the group symmetric encryption key to recover the decrypted group private key. The method also includes requesting and receiving, with the client module, the encrypted content symmetric key and the ephemeral public key from the encrypted content management module. The method also includes generating, with the client module, the second shared-secret key based on the ephemeral public key and the decrypted group private key. The method also includes decrypting the encrypted content symmetric key using the second shared-secret key. The method also includes retrieving the ciphertext data from the data storage unit. The method also includes decrypting the ciphertext data using the decrypted content symmetric key to obtain the plaintext data.

In other features, the unique information known to the user is a password.

In other features, the unique information known to the user is stored on cryptographic hardware that is in the possession of the user.

In other features, the cryptographic hardware is at least one of a smart card and a hardware token.

The present disclosure also includes a system comprising a client module configured to generate an asymmetric key pair for a user, including a user private key and a user public key. The client module is further configured to generate a symmetric encryption key for the user, the symmetric encryption key being generated based on unique information known to the user. The client module is further configured to encrypt the user private key using the symmetric encryption key to generate a user escrow key. The client module is further configured to transmit the user public key and the user escrow key to an encrypted content management module over a network, the encrypted content management module storing the user public key and the user escrow key in an encrypted content management storage unit. The client module is further configured to generate a group asymmetric key pair including a group private key and a group public key. The client module is further configured to generate a group symmetric encryption key. The client module is further configured to encrypt the group private key with the group symmetric encryption key. The client module is further configured to generate a first shared-secret key based on the user public key and the group private key using a diffie-hellman exchange algorithm. The client module is further configured to encrypt the group symmetric encryption key using the first shared-secret key to generate a group escrow key. The client module is further configured to communicate the group public key, the encrypted group private key, and the group escrow key to the encrypted content management module, the encrypted content management module storing the group public key, the encrypted group private key, and the group escrow key in the encrypted content management storage unit. The client module is further configured to encrypt plaintext data into ciphertext data using a content symmetric key. The client module is further configured to store the ciphertext data in a data storage unit. The client module is further configured to generate an ephemeral pair of keys including an ephemeral public key and an ephemeral private key. The client module is further configured to receive the group public key from the encrypted content management module. The client module is further configured to generate a second shared-secret key based on the ephemeral private key and the group public key using a diffie-hellman exchange algorithm. The client module is further configured to encrypt the content symmetric key using the second shared-secret key. The client module is further configured to communicate the encrypted content symmetric key and the ephemeral public key to the encrypted content management module, the encrypted content management module storing the encrypted content symmetric key and the ephemeral public key in the encrypted content management storage unit.

In other features, the client module is further configured to request and receive the user escrow key from the encrypted content management module. The client module is further configured to generate the symmetric encryption key based on the unique information known to the user. The client module is further configured to decrypt the user escrow key with the symmetric encryption key to obtain the user private key. The client module is further configured to generate the first shared-secret key based on the user private key and the group public key. The client module is further configured to request and receive the group escrow key from the encrypted content management module. The client module is further configured to decrypt the group escrow key using the first shared-secret key to recover the group symmetric encryption key. The client module is further configured to request and receive the encrypted group private key from the encrypted content management module. The client module is further configured to decrypt the encrypted group private key using the group symmetric encryption key to recover the decrypted group private key. The client module is further configured to request and receive the encrypted content symmetric key and the ephemeral public key from the encrypted content management module. The client module is further configured to generate the second shared-secret key based on the ephemeral public key and the decrypted group private key. The client module is further configured to decrypt the encrypted content symmetric key using the second shared-secret key. The client module is further configured to retrieve the ciphertext data from the data storage unit. The client module is further configured to decrypt the ciphertext data using the decrypted content symmetric key to obtain the plaintext data.

In other features, the unique information known to the user is a password.

In other features, the unique information known to the user is stored on cryptographic hardware that is in the possession of the user.

In other features, the cryptographic hardware is at least one of a smart card and a hardware token.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
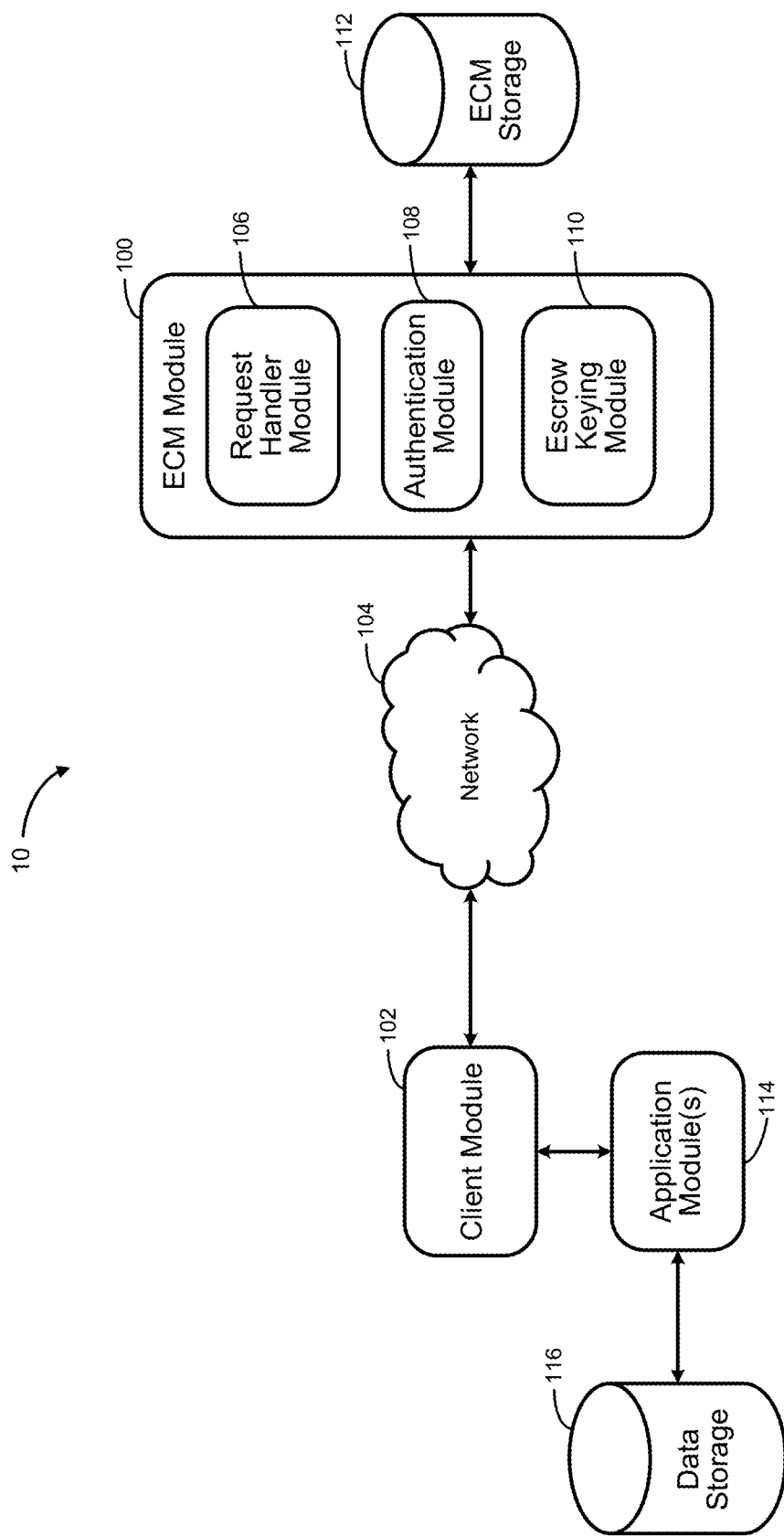
FIG. 1 is a functional block diagram of an encrypted content management system according to the present disclosure.

Example embodiments will now be described more fully with reference to the accompanying drawings.

The Encrypted Content Management (ECM) systems and methods of the present disclosure protect digital data end-to-end, across all states, including the at-rest, in-process, and in-transit states. The present disclosure implements a no-knowledge design with a repository of cryptographic material and resource locators that map the location of encrypted data and the location of the associated encryption keys. The no-knowledge design prevents any single system resource from accessing and/or identifying the correct key to decrypt any of the data. The no-knowledge design of the present disclosure is in contrast to other systems that store the information needed to decrypt data and accomplish security by authenticating users and processes and allowing access to internal network resources based on the authentication result. In addition, as discussed in further detail below, the no-knowledge design also utilizes a number of additional intermediary keys to derive the correct key to decrypt data and those additional intermediary keys are also protected and/or hidden by the ECM systems and methods of the present disclosure. This no-knowledge approach provides a clear advantage over previous approaches by ensuring that data can only be decrypted after it is delivered to an authenticated end-user, eliminating attack surfaces in the segmented encryption approach used today.

The ECM systems and methods of the present disclosure include software components that provide cryptographic key management functionality, including authentication, request handling, escrow keying, and an encrypted content database.

The cryptographic key management functionality enables external processes to encrypt data and allow future recovery of the encrypted data by some entity or entities in a secure manner. The encryption process functionally receives some plaintext (unencrypted) data as input, applies a transform (encryption algorithm), and outputs ciphertext (encrypted) data. Different cryptographic algorithms and processes are applied in a unique manner by ECM systems and methods of the present disclosure to protect the integrity of the data encryption processes utilized. The unique methods employed by the ECM systems of the present disclosure ensure secure data encryption across all three states of data.

The ECM systems and methods of the present disclosure utilize both symmetric and asymmetric cryptographic primitives. Symmetric encryption algorithms rely on a single key to both encrypt and decrypt data. The ECM systems and methods of the present disclosure utilize the Advanced Encryption Standard (AES) for symmetric encryption operations, although other symmetric encryption algorithms could be alternatively used. A symmetric encryption operation using AES is performed in a block mode such that the data is encrypted over a fixed unit of data. For example, using a 16 byte block size means the larger plaintext is divided into N/16 blocks where N is the size of the ciphertext. A padding function can be applied to data that is too short to fill a block completely. Cipher Block Chaining (CBC) and Galois Counter Mode (GCM) are the preferred AES block modes, although any mode is sufficient to work with the ECM systems and methods of the present disclosure. In addition, the ECM systems and methods of the present disclosure can support and utilize other symmetric encryption algorithms as the final symmetric key is derived from asymmetric keys external to the system, i.e., by a client on client hardware.

A symmetric key is of a specific bit-length, e.g., 128 or 256 bits in AES, referred to as the control vector (CV). When used as a block cipher in CBC mode, a secure random initialization vector (IV) is generated and must be provided along with the CV to decrypt the ciphertext. The encryption and decryption operation in CBC mode is performed over sequential blocks because each block depends on a predecessor IV, resulting in the need to store the first IV together with the CV. In GCM mode, a nonce is used as the IV and unlike CBC mode, blocks can be decrypted in parallel, i.e., each block is not dependent on the previous block to decrypt, although the initial IV nonce must still be stored with the CV for decryption operations to succeed.

A symmetric key must be protected from compromise as once it is revealed, any data that has been encrypted with the key can be decrypted. Within the context of a distributed communication network, one or more parties may need access to the symmetric key without revealing it to eavesdropping attacks or other unintended recipients. The ECM systems and methods of the present disclosure use properties of asymmetric cryptographic algorithms to generate symmetric keys while facilitating a safe way to communicate over an untrusted/unencrypted network.

Asymmetric cryptographic primitives use mathematical properties that result in two keys: a public key utilized in the encryption process and a private key utilized in the decryption process. Because only the private key can be used to decrypt data, it must be protected like a symmetric key, as discussed above. The public key however is unrestricted and may be sent over an untrusted/unsecure communications channel. Only the corresponding private key can be used to decrypt data that the public key was used to encrypt. In other words, once data is encrypted using the public key, it can only be encrypted using the corresponding private key.

As discussed in further detail below, the ECM systems and methods of the present disclosure use Elliptic-curve cryptography (ECC) asymmetric keys to derive symmetric encryption keys using the Diffie-Hellman key exchange algorithm known as Elliptic-curve Diffie-Hellman (ECDH). The Diffie-Hellman key exchange algorithm is described, for example, in U.S. Pat. No. 4,200,770, titled "Cryptographic Apparatus and Method," which is incorporated herein by reference in its entirety. The key exchange process starts with generating an ephemeral ECC key pair. The ephemeral pair's private key is exchanged with an entity's public key. The exchange process results in a shared-secret that is hashed to produce a CV (symmetric key) and IV. More specifically, the hash function generates a hash of the shared secret that is at least as long as the required CV plus IV length. The public key from the ephemeral pair is provide back to the entity who can then reverse the process to derive the same symmetric key for decryption. For example, the entity can utilize the ECDH algorithm to exchange the ephemeral pair's public key with the entity's private key to arrive at the same shared-secret, which can then be hashed to produce the same CV (symmetric key) and IV. In other words, the entity's private key is exchanged with the ephemeral public key, which results in the same shared-secret key thus enabling the final derivation of the CV and IV. In this way, the same shared-secret key can be derived using the ECDH algorithm based on (i) exchanging the ephemeral pair's public key with the entity's private key; or (ii) exchanging the ephemeral pair's private key with the entity's public key. Either combination of keys results in the same shared-secret, which can be used to derive the CV and IV.

With reference to FIG. 1, an ECM system 10 is shown and includes an ECM module 100 in communication with a client module 102 over a communication network 104. The communication network 104 can include a wide area network (WAN), such as the Internet, and/or a local area network (LAN). The ECM module 100 includes a request handler module 106 that receives and responds to requests from the client module 102, an authentication module 108 that authenticates users who interact with the ECM module 100 via the client module (all interaction/communication with the ECM module 100 over the communication network 104 is authenticated), and an escrow keying module 110 that controls access to various cryptographic keys, as discussed in further detail below. The ECM module 100 is in communication with an ECM storage unit 112. The client module 102 is in communication with one or more application modules 114, which are in communication with a client data storage unit 116. In this way, the client module 102 is in communication with both the ECM module 100 and with an application module 114. The application module 114, for example, can load the client module 102 utilizing protections to prevent the application module 114 from improperly modifying the client module 102. The client module 102 can then communicate with the application module 114 to store and retrieve cipher text from the data storage unit 116. The client module 102 can then decrypt the cipher text to recover the unencrypted data that is communicated back to the application module 114 for output/display by the application module 114, as discussed in further detail below. While one client module 102 is shown in FIG. 1 for purposes of illustration, the ECM system 10 can utilize and include multiple client modules 102 with each client module 102 being in communication with the ECM module 100 over the communication network 104 and with each client module 102 being in communication with one or more application modules 114.

Figure 2:
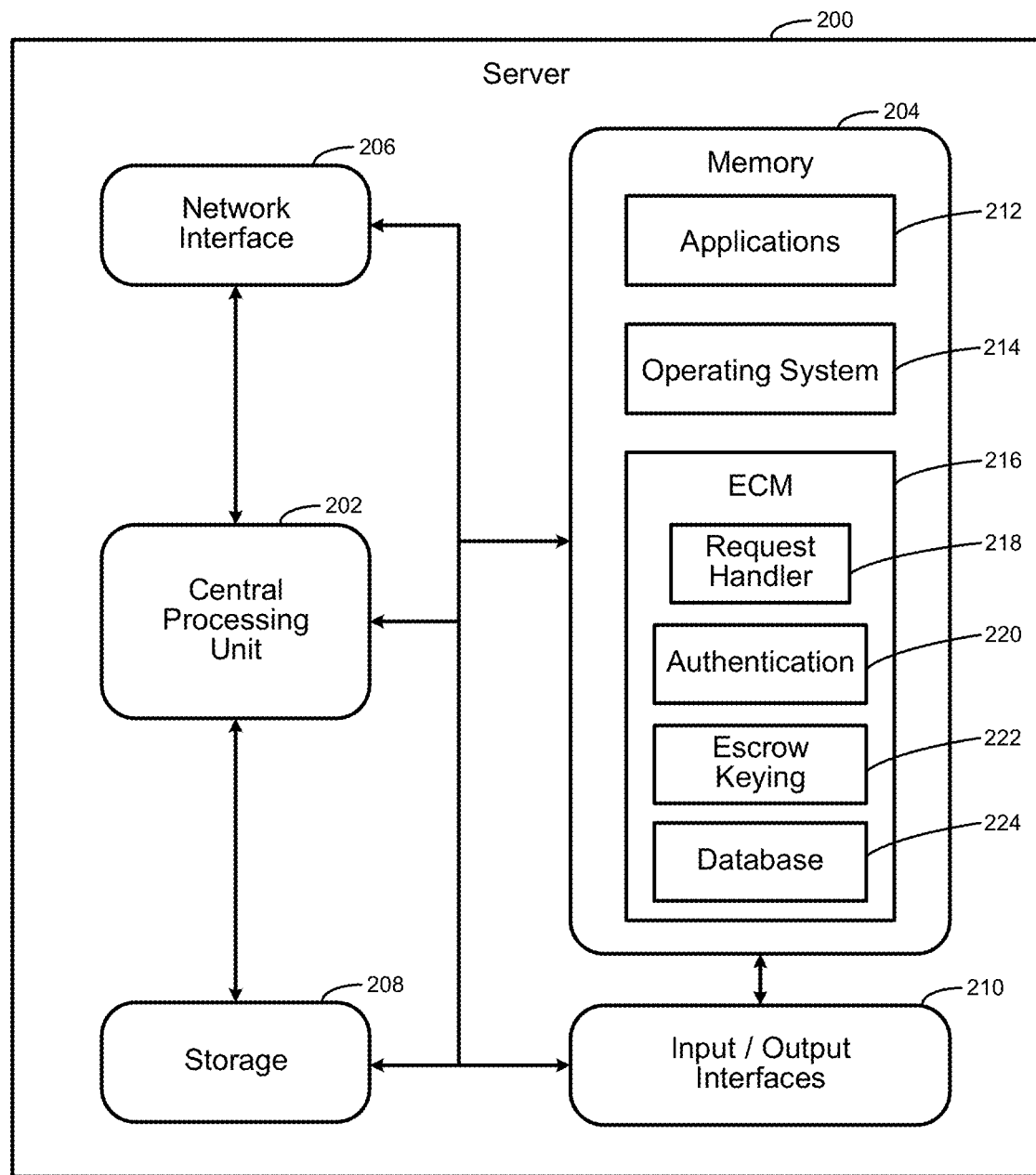
FIG. 2 is a functional block diagram of a server of an encrypted content management system according to the present disclosure.

With reference to FIG. 1 and FIG. 2, the ECM module 100, request handler module 106, authentication module 108, escrow keying module 110, and ECM storage unit 112 are implemented by a server 200. The server 200 includes a central processing unit (CPU) 202, memory 204, a network interface 206, volatile storage 208, and input/output interfaces 210. The memory 204 stores executable code for applications 212 and for the server's operating system (OS) 214. The memory 204 also stores executable ECM code 216 for the ECM module 100, executable request handler code 218 for the request handler module 106, executable authentication code 220 for the authentication module 108, and executable escrow keying code 222 for the escrow keying module 110. The memory 204 also includes a database 224 corresponding to the ECM storage unit 112. In this way, the software components utilized by the ECM systems and methods of the present disclosure are compiled into binary distribution files that are executed by the CPU 202 of the server. The server's OS 214 handles coordinating the input/output of the hardware resources and executing the ECM system's binary executable files, including the ECM code 216, the request handler code 218, the authentication code 220, and the escrow keying code 222. The server 200 can be a physical device with dedicated hardware or can be a virtual machine that shares a part of dedicated hardware resources, such as a hypervisor.

Figure 3:
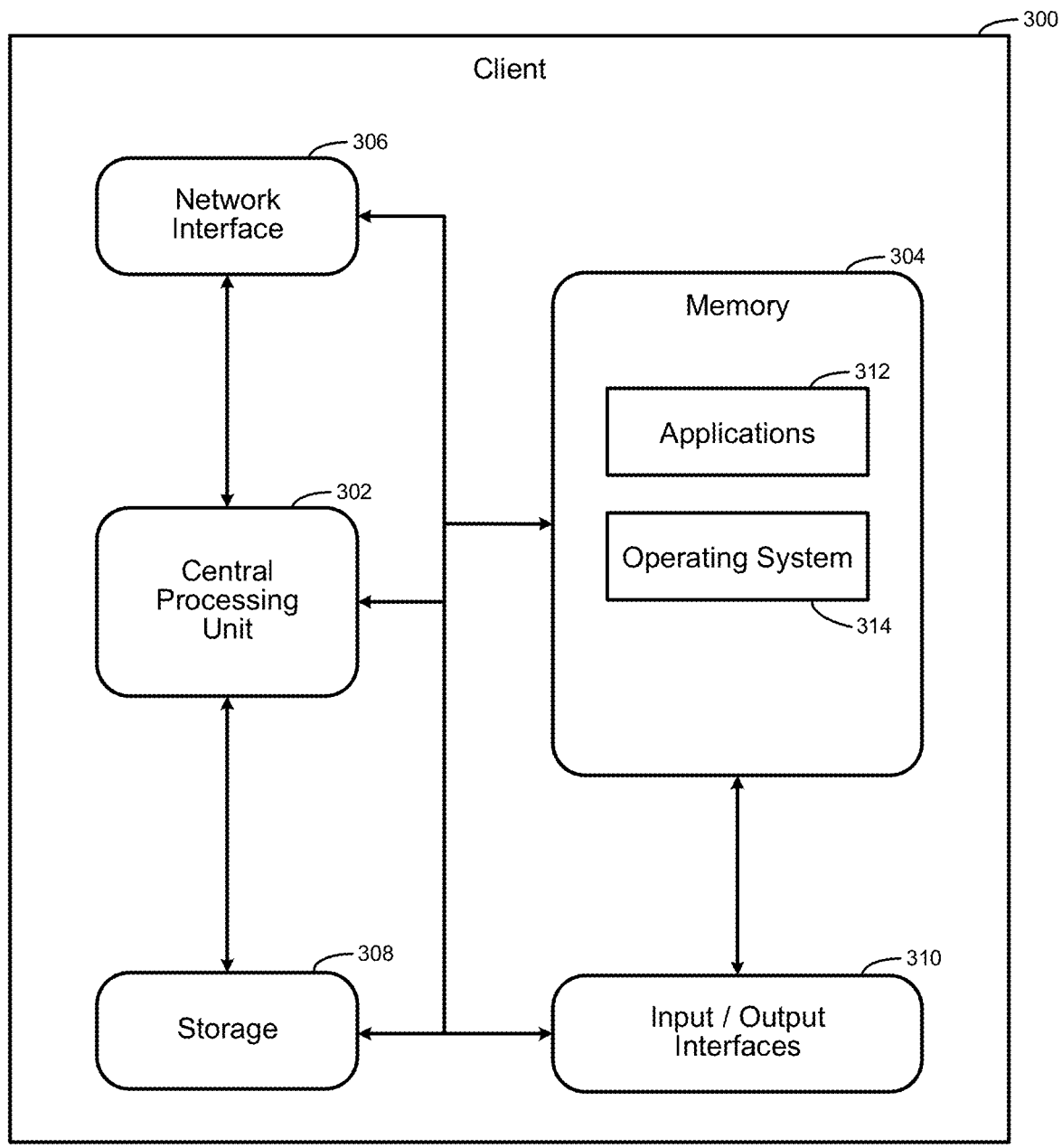
FIG. 3 is a functional block diagram of a client device of an encrypted content management system according to the present disclosure.

With reference to FIGS. 1, 2, and 3, the client module 102 and application module(s) 114 are implemented by a client device 300. As noted above, while FIG. 1 and FIG. 3 show a single client module 102 and a single client device 300, for purposes of illustration, the ECM system 10 can utilize and include multiple client modules 102 and multiple client devices 300. The client device 300 includes a CPU 302, a memory 304, a network interface 306, a volatile storage 308, and input/output interfaces 301. The memory 304 stores code for applications 312 and for the client's operating system (OS) 314. The client device 300 is capable of communicating over the communication network 104, i.e., distributed communications infrastructure such as a LAN, a WAN, the Internet, corporate Intranet, etc., via the network interface 306.

The ECM module 100 running on the server 200 listens for requests over its network interface from one or more client modules 102 running on one or more client devices 300. Communication over the communication network 104 between the ECM module 100 and the one or more client modules 102 are governed by the TCP/IP stack. The server OS 214 and the client device 300 OS 314 handle the underlying communication segmentation, which is transparent to the ECM software components that are only concerned with the application layer.

The authentication module 108 of the ECM module 100 allows user and group entities to be established for the purpose of securing key operations and to keep track of entity encryption key pairs. Users are enrolled by providing the authentication module 108 with a unique username, password, and additional factors that the ECM module 100 can utilize during a login request to verify an identity. The authentication module 108 is capable of authorizing user requests based on entity permissions, such as granting or denying access to resources. Group entities are a collection of users referred to as members. Both user and group entities maintain one or more asymmetric key pairs identified by a universally unique identifier (UUID), as discussed in further detail below. Entity key operations are handled by the escrow keying module 110.

The request handler module 106 processes requests from client modules 102 external to the ECM module 100. The client modules 102 are configured to follow a well-defined application programming interface (API) that governs what methods and data are exchanged between the client modules 102 and the ECM module 100. Requests are sent to the ECM module 100 by client modules 102 over the communication network 104 using the network interfaces 206. The HTTP web application layer is used to govern API communication.

The request handler module 106 uses client supplied tokens to authenticate requests. Permissions are calculated by the request handler module 106 based on the tokens provided by the client modules 102. The request handler module 106 authorizes or denies each request. Once a request is authorized, the request handler module 106 passes along the request by the client module 102 to the particular module that is responsible for the functionality being requested. The request handler module 106 responds to the request by the client module 102 on behalf of the particular module that addressed the functionality being requested. The request by the client module 102 results in either an error message or a response message. The response message to a client module 102 includes state information about the request, including, for example, success, failure, created, updated, deleted, etc., and, if applicable, data.

The request handler module 106 restricts communication to authorized clients only. While it may be possible for a malicious actor to successfully impersonate or steal a client's session, using strong authentication with multiple factors reduces the likelihood of these threats. Additionally, even in the face of compromise, unique user knowledge is still required to perform any sensitive decryption operations, as discussed in detail below. As such, in a worst case scenario, a malicious actor could fully compromise both a user's credentials and unique user knowledge to derive missing cryptographic material that is not accessible in the ECM system. Even at this magnitude of a system breach, however, only encrypted content that the comprised user has cryptographic access to can be breached.

Figure 4:
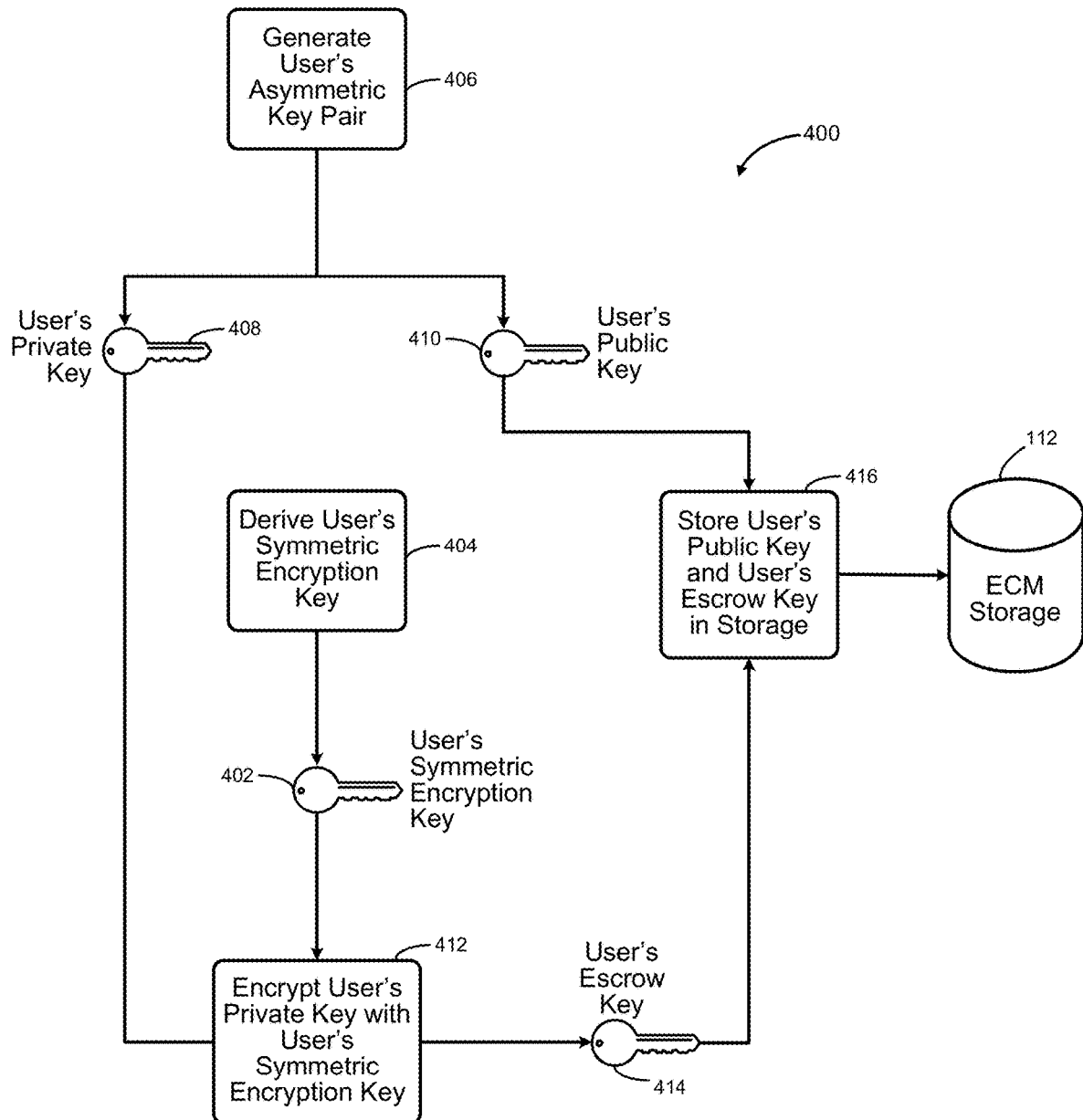
FIG. 4 is a flow diagram for a user key creation process of an encrypted content management method according to the present disclosure.

With reference to FIG. 4, a flow diagram 400 for a user key creation process for the ECM systems and methods of the present disclosure is shown. The security model used by the ECM systems and methods of the present disclosure requires that no single component can be compromised to reveal encrypted content. To ensure that the authentication module 108 cannot reveal content encryption keys to a malicious actor, e.g. using stolen credentials, the ECM systems and methods of the present disclosure rely on unique user knowledge to derive a symmetric key that is not known to the ECM module 100 in any manner. With reference to FIG. 4, the user's symmetric encryption key 402 is derived or generated at 404 by the client module 102. For example, the application module(s) 114 may initiate and load an ECM client application that performs the functionality described as being performed by the client module 102 with reference to FIG. 4. The user's symmetric encryption key 402 can be generated by a password-based derivation based on unique knowledge known only by the user. Additionally or alternatively, the user's symmetric encryption key 402 can be generated and stored on cryptographic hardware that is in the possession of the user, such as a user's smart card or a hardware token. The smart card, for example, can include a Common Access Card (CAC), i.e., a smart card issued by a governmental agency for identification and authentication purposes that is the size of a credit card. Additionally or alternatively, the user's symmetric encryption key 402 can be generated and stored on a hardware authentication device, such as a YubiKey, manufactured by Yubico. Additionally or alternatively, the user's symmetric encryption key 402 can be generated and stored by a hardware security module (HSM), i.e., a physical computing device that safeguards and manages digital keys, performs encryption and decryption functions, etc. The resulting symmetric key is referred to as the user's symmetric encryption key 402.

At 406, the client module 102 generates an asymmetric key pair that is associated with the user's account. The user's asymmetric key pair includes a user's private key 408 and a user's public key 410. At 412, the client module 102 encrypts the user's private key 408 of the asymmetric key pair using the user's symmetric encryption key 402. The user's encrypted private key is referred to as the user's escrow key 414. The client module 102 then sends the user's escrow key 414 and the user's public key 410 to ECM module 100 and, more specifically, to the request handler module 106 of the ECM module 100. The request handler module 106 authenticates the user of the client module 102 with the authentication module 108 of the ECM module 100. Upon authentication, the request handler module 106 communicates the user's unencrypted asymmetric public key 410 along with the user's escrow key 414, which is the user's corresponding private key 408 that has been encrypted using the user's symmetric encryption key to the escrow keying module 110. At 416, the escrow keying module 110 then stores the user's public key 410 and the user's escrow key 414 in the ECM storage unit 112. The ECM module 100 can then make available the user's public key 410 to external processes that wish to make encrypted content accessible to the user. The encrypted asymmetric private key, i.e., the user's escrow key 414, is held in escrow by the escrow keying module 110 and stored in the ECM storage unit 112. When users are then authenticated by the authentication module 108 of the ECM module 100 and need to perform a decryption operation, the client module 102 can request the user's escrow key 414 from the ECM module 100 via a request that is received by the request handler module 106. Upon authentication by the authentication module 108, the user's escrow key 414 is retrieved and communicated to the client module 102. The encrypted content is then retrieved from a storage system external to the ECM module 100, such as the data storage unit 116. The user than provides the missing knowledge to generate the user's symmetric encryption key 402 which can then be used to decrypt the user's escrow key 414 to recover the user's private key 408. The decrypted escrow key, i.e., the user's private key 408, is then available for use to decrypt the encrypted content, as discussed in further detail below.

The ECM storage unit 112 includes an encrypted content database that acts as a ledger for encrypted content. The encrypted content database records the location of the encrypted content as a uniform resource identifier (URI). The decryption process performed external to the ECM module 100 is then responsible for retrieving the encrypted content at the location designated by the URI. The cryptographic keys held in escrow and stored by the ECM module 100 in the ECM storage unit 112 are recorded with the content URI in the encrypted content database such that all necessary data is provided to an authorized request through the request handler module 106.

Figure 5:
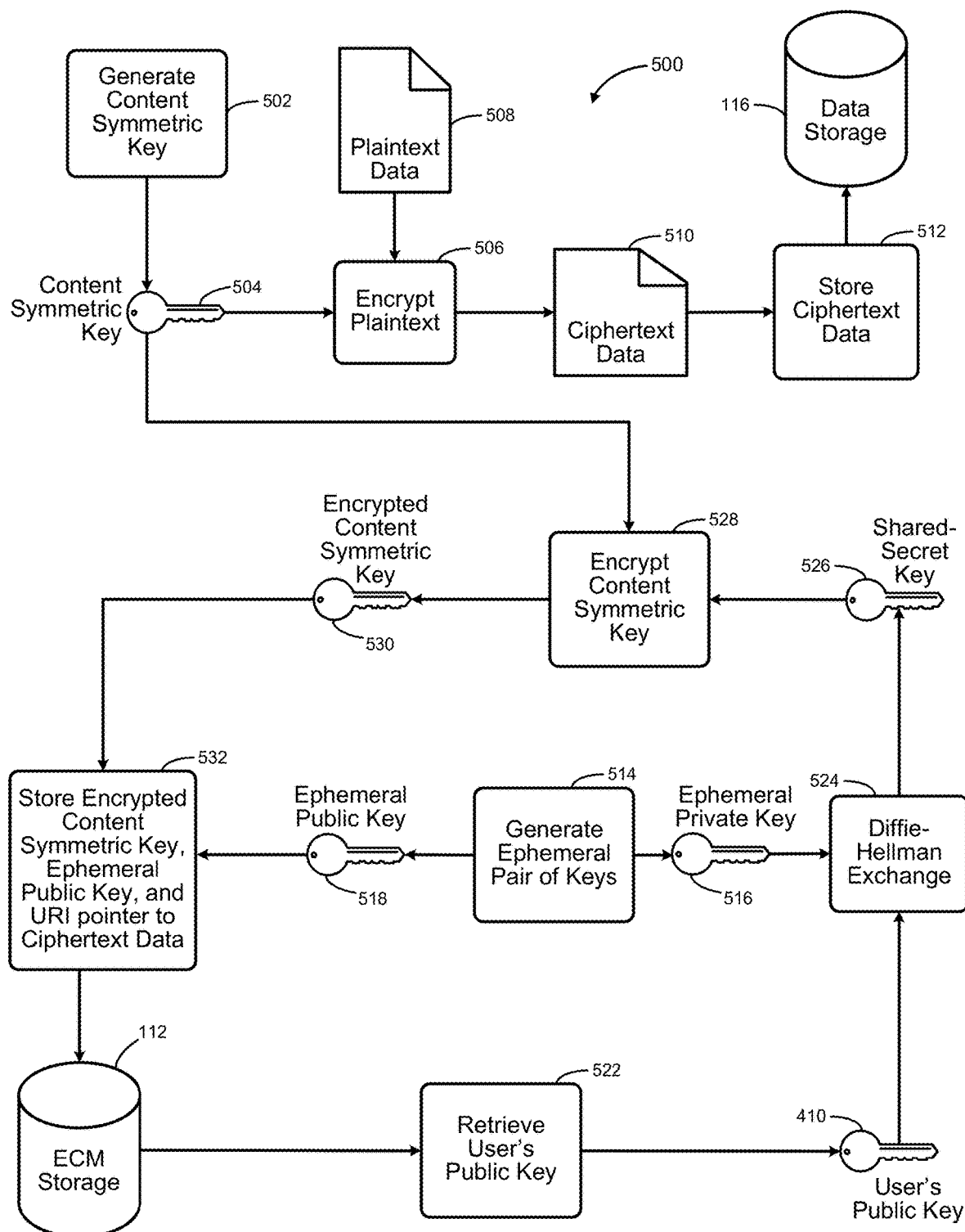
FIG. 5 is a flow diagram for a content encryption process using a user key of an encrypted content management method according to the present disclosure.

With reference to FIG. 5, a flow diagram 500 for a content encryption process for a user with a user key utilizing the ECM systems and methods of the present disclosure is shown. At 502, the client module 102 generates a content symmetric key 504 for encrypting content. At 506, the client module 102 receives plaintext data 508 from the application module 114 and encrypts the plaintext data 508 using the content symmetric key 504 to generate ciphertext data 510.

At 512, the client module 102 communicates the ciphertext data 510 to the application module 114 for storage in the data storage unit 116. At 512, the client module 102 also records the URI associated with the location of the encrypted content, i.e., the cipher text data 510, stored in the data storage unit 116, for subsequent storage, as discussed in further detail below.

At this point, the plaintext data 508 has been encrypted using the content symmetric key 504 and the encrypted ciphertext data 510 has been stored in the data storage unit 116.

At 514, the client module 102 generates an ephemeral pair of keys including an ephemeral private key 516 and an ephemeral public key 518. At 522, client module 102 requests the ECM module 100 to retrieve the user's public key 410, i.e., the public key 410 of the previously authenticated user, from the ECM storage unit 112. The user's public key 410 was previously stored in the ECM storage unit 112, as discussed above with reference to 416 of FIG. 4. The ECM module 100 retrieves the user's public key 410 and communicates it to the client module 102.

At 524, the client module 102 uses the ECDH key exchange algorithm with the ephemeral private key 516 and the user's public key 410 to generate a shared-secret key 526. As noted above, the Diffie-Hellman key exchange algorithm is described, for example, in U.S. Pat. No. 4,200,770, titled "Cryptographic Apparatus and Method," which is incorporated herein by reference in its entirety. The ECDH algorithm uses the ephemeral private key 516 and the user's public key 410 to generate the shared-secret key 526. As discussed in further detail below with respect to the decryption process described in FIG. 6, the ECDH algorithm can be used to generate that same shared-secret key 526 using the ephemeral public key 518 and the user's private key 408. In other words, the same shared-secret key can be derived using the ECDH algorithm based on (i) exchanging the ephemeral private key 516 with the user's public key 410, or (ii) exchanging the ephemeral public key 518 with the user's private key 408. Either combination of keys results in the same shared-secret key 526 being generated. After generating the shared-secret key 526, the ephemeral private key 516 can be discarded.

At 528, the shared-secret key 526 is hashed to produce a CV (symmetric key) and IV. As discussed above, the hash function generates a hash of the shared secret that is at least as long as the required CV plus IV length. The client module 102 then encrypts the content symmetric key 504 based on the shared-secret key 526 and, more specifically, the CV and IV, to generate an encrypted content symmetric key 530. Once the client module 102 encrypts the content symmetric key, the client module 102 can discard the content symmetric key. At 532, the client module 102 communicates the encrypted content symmetric key 530 and the ephemeral public key 518 to the ECM module 100 for storage in the ECM storage unit 112 along with a URI pointer to the ciphertext data 510 stored in the data storage unit 116. In addition, the client module 102 can communicate a list of users, groups, and/or keys that were involved in and/or utilized by the client module 102 in the process of encrypting the content symmetric key 504 to generate the encrypted content symmetric key 530 for storage in the ECM storage unit 112 along with the encrypted content symmetric key 530, the ephemeral public key 518, the URI pointer to the cipher text data 510, and any other applicable metadata and supporting information for storage in the ECM storage unit 112. For example, the client module 102 generates a request to the ECM module 100 requesting that the information be stored by the ECM module 100. The request handler module 106 receives the request from the client module 102 and authenticates the user of the client module 102 with the authentication module 108. Upon authentication, the escrow keying module 110 stores the information, including the encrypted content symmetric key 530, the ephemeral public key 518, the URI pointer to the ciphertext data 510 in the data storage unit 116, the list of users, groups, and/or keys that were involved in and/or utilized by the client module 102 in the process of encrypting the content symmetric key 504 in the ECM storage unit 112, any other applicable metadata and supporting information, in the ECM storage unit 112.

At this point, the user's encrypted data is stored as ciphertext data 510 in the user's data storage unit 116 and the key necessary to decrypt the ciphertext data 510, i.e., the content symmetric key 504, is encrypted as the encrypted content symmetric key 530 and stored in the ECM storage unit 112. Importantly, the ECM module 100 never, by itself, has and does not store the necessary information needed to decrypt the encrypted content symmetric key 530. In this way, the ECM module 100 is a "no-knowledge" system insofar as it does not have, by itself, the information necessary to decrypt the encrypted content symmetric key 530. In other words, the ECM module 100 stores information needed to decrypt the ciphertext data 510, but it never holds that information in an unencrypted form and never possesses a means, by itself, to recover or decrypt the content symmetric key 504. For example, there are no system administrators that have the information necessary to decrypt the encrypted content symmetric key 530 and obtain the content symmetric key 504 needed to decrypt the user's encrypted ciphertext data 510. As discussed in further detail below, the encrypted content symmetric key 530 cannot be decrypted without the unique user knowledge used derive the user's symmetric encryption key 402. In this way, the ECM system 10 and the ECM module 100 cannot decrypt the encrypted content symmetric key 530 to reveal the content symmetric key 504 to a malicious actor, e.g. using stolen credentials, without the unique user knowledge used to derive the symmetric encryption key 402 that is not known to the ECM module 100 in any manner.

Figure 6:
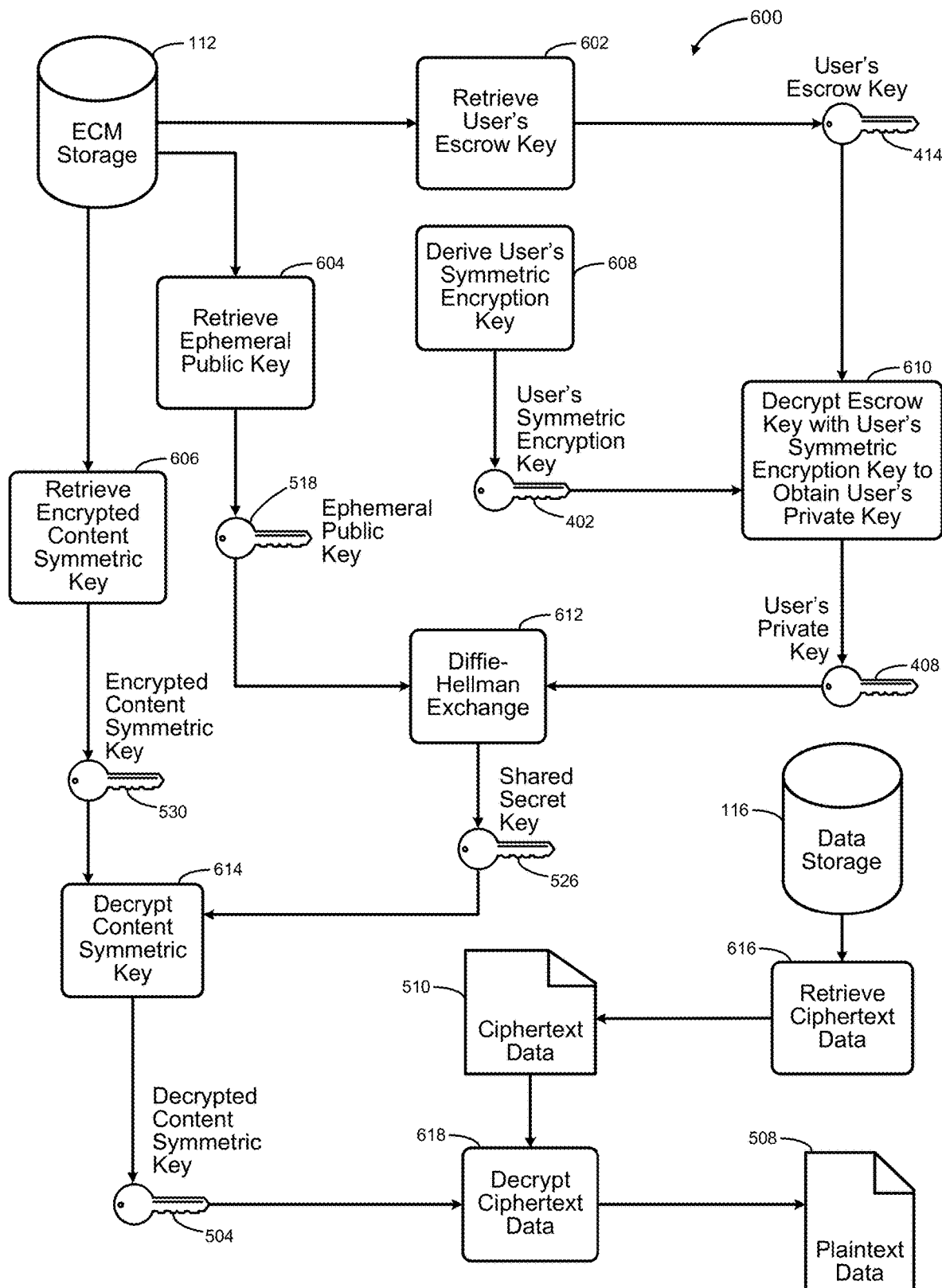
FIG. 6 is a flow diagram for a content decryption process using a user key of an encrypted content management method according to the present disclosure.

With reference to FIG. 6, a flow diagram 600 for a process of decrypting previously encrypted content of an encrypted content management method according to the present disclosure is shown. Clients that are authenticated and authorized can have encrypted content and the stored escrow key information provided to them after requesting it from the request handler module 106 of the ECM module 100. The client module 102 then requests the missing and unique knowledge from the user to derive the user's symmetric encryption key 402 that was used to encrypt the user's private key 408 of the user's asymmetric key pair 408, 410. The escrow key information is then retrieved from ECM storage unit 112 and includes the ephemeral public key 518 of the ephemeral pair of keys 516, 518. The user's encrypted content symmetric key 530 is also retrieved from ECM storage unit 112. The user's symmetric encryption key 402 is then used to decrypt the user's escrow key 414 to recover the user's private key 408, i.e., the result of decrypting the user's escrow key 414 is the user's private key 408. The ECDH key exchange algorithm is then used with the user's private key 408 and the ephemeral public key 518 to generate the shared-secret key 526. The shared-secret key 526 can then be hashed, as discussed above, and used to decrypt the user's encrypted content symmetric key 530 to recover the user's content symmetric key 504. The content symmetric key 504 can then be used to decrypt the cipher text data 510 to arrive at the plaintext data 508.

With continued reference to FIG. 6, at 602, in response to a request from the client module 102 and upon authentication by the authentication module 108, the escrow keying module 110 of the ECM module 100 retrieves the user's escrow key 414 from the ECM storage unit 112. At 604, the escrow keying module 110 of the ECM module 100 retrieves the ephemeral public key 518 from the ECM storage unit 112. At 606, the escrow keying module 110 of the ECM module 100 retrieves the user's encrypted content symmetric key 530. The user's escrow key 414, the user's encrypted content symmetric key 530, and the ephemeral public key 518 are communicated to the client module 102. At 608, the client module 102 derives the user's symmetric encryption key 402 based on the unique user knowledge known only to the user. As discussed above, the user's symmetric encryption key 402 can be generated by a password-based derivation based on unique knowledge known only by the user. Additionally or alternatively, the user's symmetric encryption key 402 can be generated and stored on cryptographic hardware that is in the possession of the user, such as a user's smart card or a hardware token. The client module 102 receives the user's escrow key 414, the ephemeral public key 518, and the user's encrypted content symmetric key 530 from the ECM module 100. At 610, the client module 102 decrypts the user's escrow key with the user's symmetric encryption key 402 to obtain the user's private key 408. For example, as discussed above, the client module 102 may include an ECM client application that performs the functionality described as being performed by the client module 102 with reference to FIG. 6.

At 612, the client module 102 performs the ECDH key exchange algorithm with the user's private key 408 and the ephemeral public key 518 to generate the shared-secret key 526. The shared-secret key 526 is then hashed by the client module 102 to produce a CV and IV, as discussed above. At 614, the client module 102 decrypts the user's encrypted content symmetric key 530 using the shared-secret key 526 to obtain the user's decrypted content symmetric key 504.

At 616, the client module 102 retrieves the ciphertext data 510 from the data storage unit 116. For example, the client module 102 can obtain the URI associated with the ciphertext data 510 and retrieve the ciphertext data 510 from the location in the data storage unit 116 indicated by the URI. At 618, the client module 102 decrypts the ciphertext data 510 using the content symmetric key 504 to generate the original unencrypted plaintext data 508.

In this way, the ECM system 10 of the present disclosure allows a user to retrieve and decrypt the necessary keys for the user to decrypt its encrypted ciphertext data 512, based on unique knowledge known only to the user that is not stored anywhere in the ECM module 100 or ECM storage unit 112 and that is not known to any administrator or other user of the ECM system 10.

Once the ciphertext data 510 is decrypted into plaintext data 508, the client module 102 and, more specifically, the application module(s) 114 in communication with the client module 102 can display, process, review, analyze, and/or modify the plaintext data 508. In the event the plaintext data 508 is modified, it can be encrypted again using the process discussed above with respect to FIG. 5 and stored in the data storage unit 116. In the event the plaintext data 508 is not modified, the client module 102 can simply discard the plaintext data 508 while an encrypted copy of the plaintext data, i.e., the ciphertext data 510, remains securely stored in the data storage.

Figure 7:
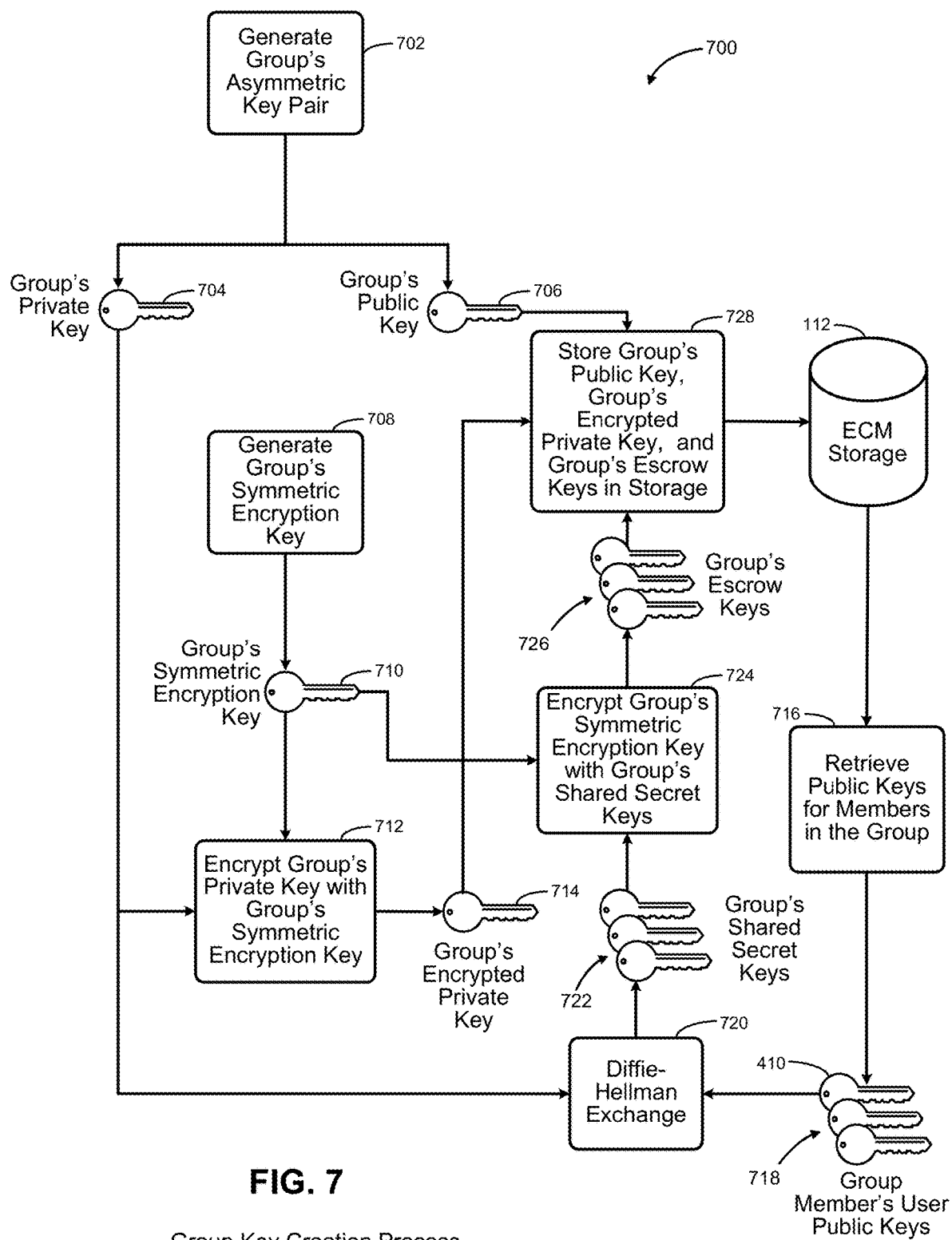
FIG. 7 is a flow diagram for a group key creation process of an encrypted content management method according to the present disclosure.

With reference to FIG. 7, a flow diagram 700 for a group key creation process of an encrypted content management method according to the present disclosure is shown. Group keys are used to encrypt and decrypt data that is authorized to be accessible to all members of a particular group. In other words, users can be members of one or more groups and each of those groups can have data and content that is available to any authorized member of that group. The group key creation process shown in FIG. 7 can be used by the ECM system 10 to generate the necessary group keys to enable users to encrypt and decrypt such data that is accessible to all authorized members of the group.

At 702, the client module 102 generates an asymmetric key pair for the group, including the group's private key 704 and the group's public key 706. As discussed above, the client module 102 may include an ECM client application that performs the functionality described as being performed by the client module 102 with reference to FIG. 7. In particular, the client module 102 can be operated by an authorized user within a particular group and can generate encryption keys for the group using the functionality described in FIG. 7. At 708, the client module 102 generates a symmetric encryption key 710 for the group. At 712, the client module 102 encrypts the group's private key with the group's symmetric encryption key 710 to generate the group's encrypted private key 714.

At 716, the client module 102 retrieves the public keys 410 for all users that are members of the group for which keys are being generated. The set of public keys for all users that are members of the group is referred to as the group's public keys 718. The client module 102, for example, can submit a request for the group's public keys 718 to the request handler module 106 of the ECM module 100. The authentication module 108 of the ECM module 100 can then authenticate the particular user making the request and confirm that the particular user is a member of the group for which public keys 718 are being requested. At 720, the client module 102 performs the ECDH key exchange algorithm with the group's private key 704 and with the public key 410 within the group member's user public keys 718 to generate a set of shared-secret keys 722 for the group. In other words, the set of shared-secret keys 722 for the group includes a shared-secret key corresponding to each user that is a member of the group based on performing the ECDH key exchange algorithm with the group's private key 704 with each group member's public key 410 within the set of the group member's user public keys 718. Each shared-secret key within the shared-secret keys 722 is then hashed by the client module 102 to produce a CV and IV, as discussed above. Once the group's encrypted private key 714 and the group's shared-secret keys 722 have been generated, the client module 102 can discard the group's private key 704. At 724, the client module 102 encrypts the group's symmetric encryption key 710 based on each shared-secret key within the group's shared-secret key to generate a set of encrypted group symmetric encryption keys. As noted above, at 712, the group's symmetric encryption key 710 was used to encrypt the group's private key 704 to generate the group's encrypted private key 714. The encrypted group symmetric encryption keys are also referred to at the group's escrow keys 726. In this way, the group's escrow keys 726 include an escrow key corresponding to each user within the particular group for which keys are being generated. In this way, each user's escrow key is an encrypted version of the group's symmetric encryption key 710 that has been encrypted with a shared-secret key that was generated based on that user's public key 410.

At 728, client module 102 sends the group's public key 706, the group's encrypted private key 714, and the group's escrow keys 726 to the ECM module 100 for storage in the ECM storage unit 112. Specifically, the client module 102 sends a request to the request handler module 106 requesting that the group's public key 706 and the group's escrow keys 726 be stored. The request handler module 106 receives the request and the authentication module 108 of the ECM module 100 authenticates the particular user making the request and confirms that the user is a member of the particular group associated with the request. Upon authentication by the authentication module, the escrow keying module 110 of the ECM module 100 stores the group's public key 706, the group's encrypted private key 714, and the group's escrow keys 726 in the ECM storage unit 112.

Figure 8:
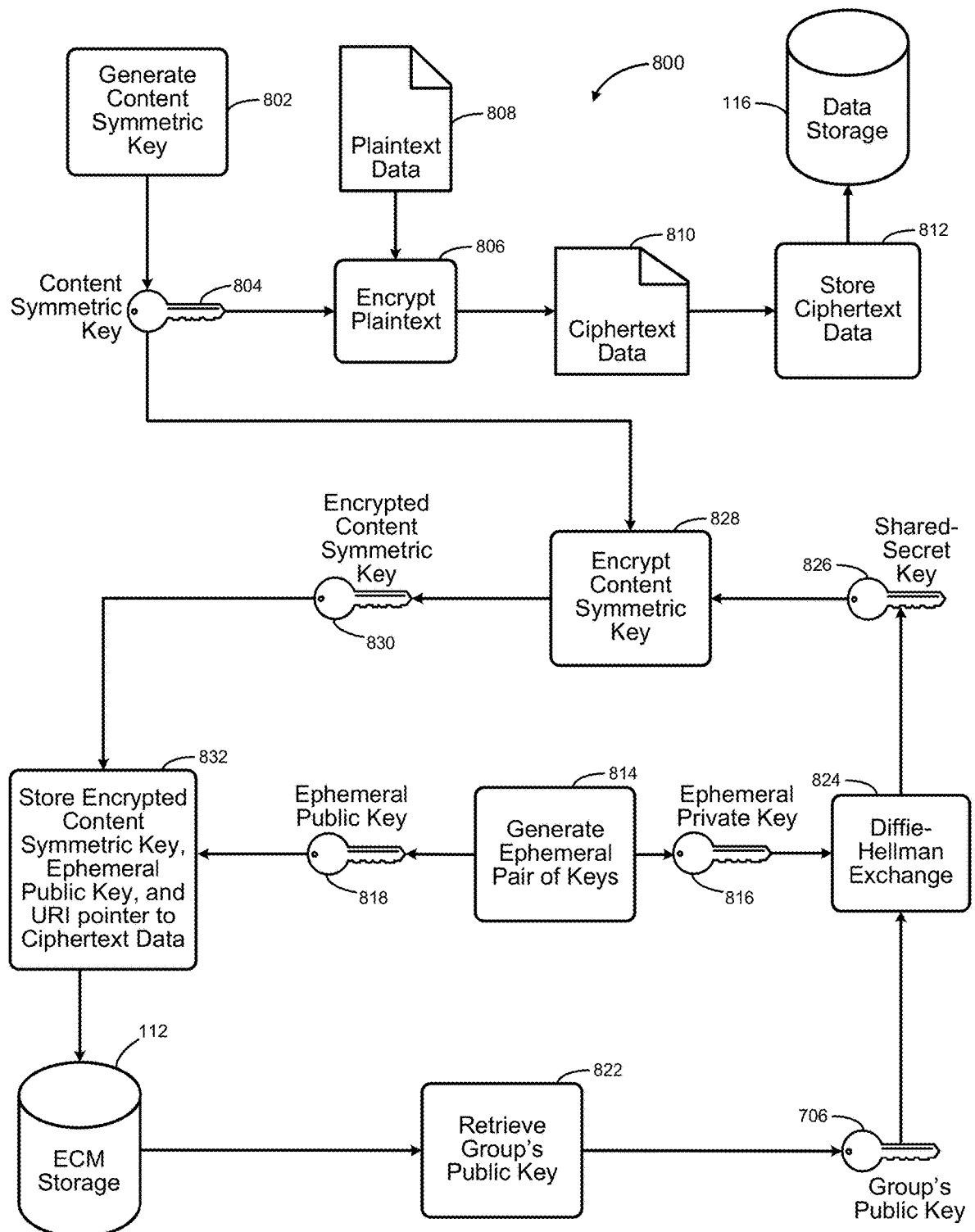
FIG. 8 is a flow diagram for a content encryption process using a group key of an encrypted content management method according to the present disclosure.

With reference to FIG. 8, a flow diagram 800 for a group content encryption process utilizing the ECM systems and methods of the present disclosure is shown. For example, the flow diagram 800 can be used to encrypt content that a user of a group would like to be accessible to other members within the group. At 802, the client module 102 of a member of the group generates a content symmetric key 804 for encrypting content. At 806, the client module 102 receives plaintext data 508 from the application module 114 and encrypts the plaintext data 808 using the content symmetric key 804 to generate ciphertext data 810. At 812, the client module 102 communicates the ciphertext data 810 to the application module 114 for storage in the data storage unit 116. At 812, the client module 102 also records the URI associated with the location of the encrypted content, i.e., the cipher text data 810, stored in the data storage unit 116, for subsequent storage, as discussed in further detail below.

At this point, the plaintext data 808 has been encrypted using the content symmetric key 804 and the encrypted ciphertext data 810 has been stored in the data storage unit 116.

At 814, the client module 102 generates an ephemeral pair of keys including an ephemeral private key 816 and an ephemeral public key 818. At 822, client module 102 requests the ECM module 100 to retrieve the group's public key 706, i.e., the group public key 706 of the group associated with the plaintext data 808, from the ECM storage unit 112. The group's public key 706 was previously stored in the ECM storage unit 112, as discussed above with reference to 728 of FIG. 7. The ECM module 100 retrieves the group's public key 706 and communicates it to the client module 102.

At 824, the client module 102 uses the ECDH key exchange algorithm with the ephemeral private key 816 and the group's public key 706 to generate a shared-secret key 826. As noted above, the Diffie-Hellman key exchange algorithm is described, for example, in U.S. Pat. No. 4,200,770, titled "Cryptographic Apparatus and Method," which is incorporated herein by reference in its entirety. The ECDH algorithm uses the ephemeral private key 816 and the group's public key 706 to generate the shared-secret key 826. As discussed in further detail below with respect to the decryption process described in FIG. 9A and FIG. 9B, the ECDH algorithm can be used to generate that same shared-secret key 826 using the ephemeral public key 818 and the group's private key 704. In other words, the same shared-secret key can be derived using the ECDH algorithm based on (i) exchanging the ephemeral private key 816 with the group's public key 706, or (ii) exchanging the ephemeral public key 818 with the group's private key 704. Either combination of keys results in the same shared-secret key 826 being generated. After generating the shared-secret key 826, the ephemeral private key 816 can be discarded.

At 828, the shared-secret key 826 is hashed to produce a CV (symmetric key) and IV. As discussed above, the hash function generates a hash of the shared secret that is at least as long as the required CV plus IV length. The client module 102 then encrypts the content symmetric key 804 based on the shared-secret key 826 and, more specifically, the CV and IV, to generate an encrypted content symmetric key 830. Once the client module 102 encrypts the content symmetric key 804, the client module 102 can discard the content symmetric key 804. At 832, the client module 102 communicates the encrypted content symmetric key 830 and the ephemeral public key 818 to the ECM module 100 for storage in the ECM storage unit 112 along with a URI pointer to the ciphertext data 810 stored in the data storage unit 116. In addition, the client module 102 can communicate a list of users, groups, and/or keys that were involved in and/or utilized by the client module 102 in the process of encrypting the content symmetric key 804 to generate the encrypted content symmetric key 830 for storage in the ECM storage unit 112 along with the encrypted content symmetric key 830, the ephemeral public key 818, the URI pointer to the cipher text data 810, and any other applicable metadata and supporting information for storage in the ECM storage unit 112. For example, the client module 102 generates a request to the ECM module 100 requesting that the information be stored by the ECM module 100. The request handler module 106 receives the request from the client module 102 and authenticates the user of the client module 102 with the authentication module 108. Upon authentication, the escrow keying module 110 stores the information, including the encrypted content symmetric key 830, the ephemeral public key 818, the URI pointer to the ciphertext data 810 in the data storage unit 116, the list of users, groups, and/or keys that were involved in and/or utilized by the client module 102 in the process of encrypting the content symmetric key 804 in the ECM storage unit 112, any other applicable metadata and supporting information, in the ECM storage unit 112.

At this point, the group's encrypted data is stored as ciphertext data 810 in the data storage unit 116 and the key necessary to decrypt the ciphertext data 810, i.e., the content symmetric key 804, is encrypted as the encrypted content symmetric key 830 and stored in the ECM storage unit 112. Importantly, the ECM module 100 never, by itself, has and does not store the necessary information needed to decrypt the encrypted content symmetric key 830. In this way, the ECM module 100 is a "no-knowledge" system insofar as it does not have, by itself, the information necessary to decrypt the encrypted content symmetric key 830. In other words, the ECM module 100 stores information needed to decrypt the ciphertext data 810, but it never holds that information in an unencrypted form and never possesses a means, by itself, to recover or decrypt the content symmetric key 804. For example, there are no system administrators that have the information necessary to decrypt the encrypted content symmetric key 830 and obtain the content symmetric key 804 needed to decrypt the encrypted ciphertext data 810. In this way, the ECM system 10 and the ECM module 100 cannot decrypt the encrypted content symmetric key 830 to reveal the content symmetric key 804 to a malicious actor, e.g. using stolen credentials.

Figure 9A:
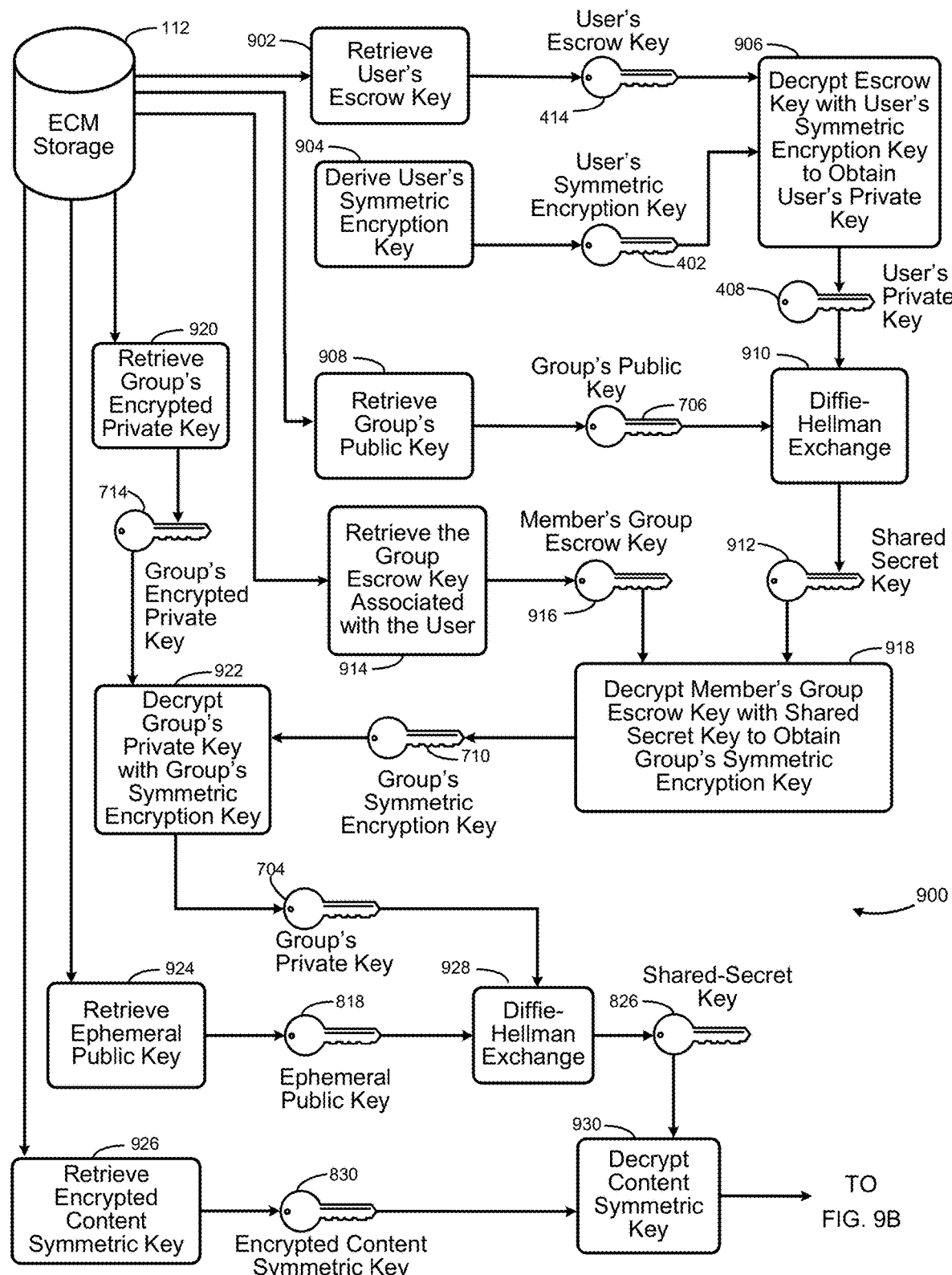
FIG. 9A is a flow diagram for a content decryption process using a group key of another encrypted content management method according to the present disclosure.

With reference to FIG. 9A, a flow diagram 900 for a process of decrypting previously encrypted group content of an encrypted content management method according to the present disclosure is shown. Users that are authenticated by the authentication module 108 and confirmed to be a member of a particular group can access that group's encrypted content based on the process for decryption shown in FIG. 9. At 902, the client module 102 requests the user's escrow key 414 from the ECM module 100. In response to the request from the client module 102, the authentication module 108 of the ECM module 100 authenticates the user and, upon authentication, the escrow keying module 110 of the ECM module 100 retrieves the user's escrow key 414 from the ECM storage unit 112 and provides it to the client module 102. The user's escrow key 414 is described above with reference to FIG. 4. At 904, the client module 102 derives the user's symmetric encryption key 402 based on the unique user knowledge known only to the user. As discussed above with reference to FIG. 4, the user's symmetric encryption key 402 can be generated by a password-based derivation based on unique knowledge known only by the user. Additionally or alternatively, the user's symmetric encryption key 402 can be generated and stored on cryptographic hardware is in the possession of the user, such as a user's smart card or a hardware token. At 906, the client module 102 decrypts the user's escrow key 414 using the user's symmetric encryption key 402 to obtain the user's private key 408. The user's private key 408 is described above with reference to FIG. 4.

At 908, the client module 102 requests the group's public key 706 for the user group associated with the ciphertext data 810 that the user is attempting to decrypt from the ECM module 100. The request handler module 106 of the ECM module 100 retrieves the group's public key 706 from the ECM storage unit 112. At 910, the client module 102 performs the ECDH key exchange algorithm with the group's public key 706 and the user's private key 408 to generate a shared-secret key. The resulting shared-secret key 912 is the same as the shared-secret key that was generated at 720 of FIG. 7 using the user's public key 410 and the group's private key 704. As described above, the shared-secret key 912 is then hashed by the client module 102 to produce a CV and IV, as discussed above. At 914, the client module 102 requests the group escrow key 916 associated with this particular user from the group's escrow keys 726. The group's escrow keys 726 are described above with reference to FIG. 7. The client module 102 requests the group escrow key 916 from the ECM module 100 and the request handler module 106 receives the request. The authentication module 108 authenticates the user and, upon authentication, the escrow keying module 110 retrieves the group escrow key 916 from the ECM storage unit 112 and communicates it to the client module 102.

At 918, the client module 102 decrypts the member's group escrow key 916, i.e., the group escrow key associated with this particular user, using the shared-secret key 912 to obtain the group's symmetric encryption key 710. The group's symmetric encryption key 710 is discussed above with respect to FIG. 7. At 920, the client module 102 retrieves the group's encrypted private key 714. Specifically, the client module 102 requests the group's encrypted private key 714 from the ECM module 100 and the request handler module 106 receives the request. The authentication module 108 authenticates the user and, upon authentication, the escrow keying module 110 retrieves the group's encrypted private key 714 from the ECM storage unit 112 and communicates it to the client module 102. At 922, the client module decrypts the group's encrypted private key 714 using the group's symmetric encryption key 710 to obtain the group's private key 704. The group's encrypted private key 714 and the group's private key 704 are described above with reference to FIG. 7.

At 924, in response to a request from the client module 102 and upon authentication by the authentication module 108, the escrow keying module 110 of the ECM module 100 retrieves the ephemeral public key 818 from the ECM storage unit 112. The ephemeral public key 818 is described above with respect to FIG. 8. At 926, the escrow keying module 110 of the ECM module 100 retrieves the encrypted content symmetric key 830. The encrypted content symmetric key is also described above with respect to FIG. 8.

At 928, the client module 102 performs the ECDH key exchange algorithm with the group's private key 704 and the ephemeral public key 818 to generate the shared-secret key 826. The shared-secret key 826 is then hashed by the client module 102 to produce a CV and IV, as discussed above. At 930, the client module 102 decrypts the encrypted content symmetric key 830 using the shared-secret key 826 to obtain the user's decrypted content symmetric key 804, shown in FIG. 9B. At this point in the process, the flow diagram 900 continues from FIG. 9A to FIG. 9B.

Figure 9B:
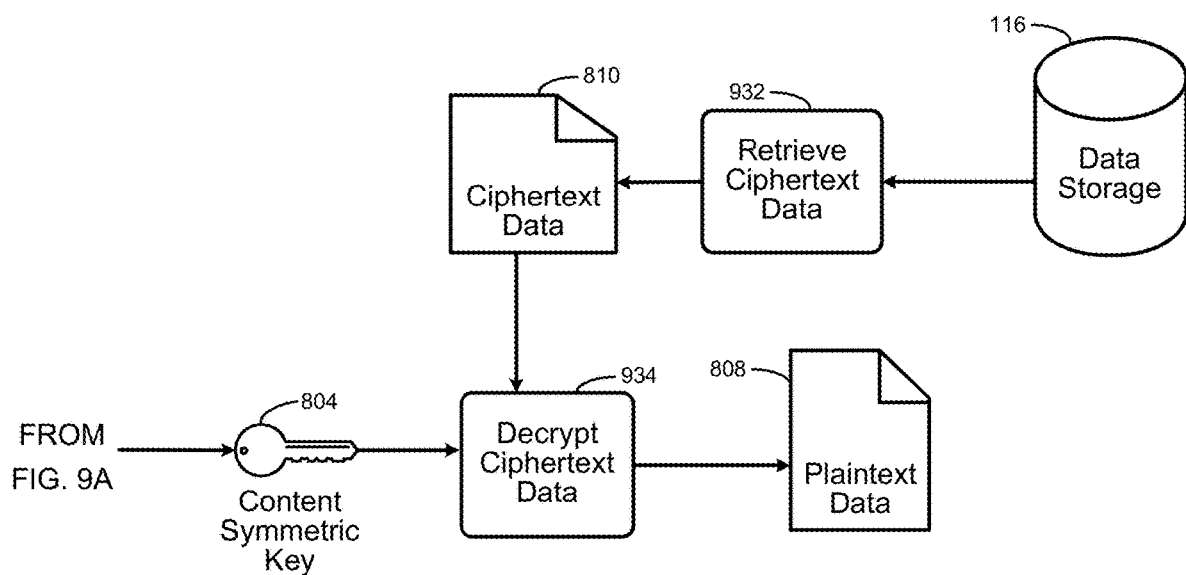
FIG. 9B is a continuation of the flow diagram from FIG. 9A.

With reference to FIG. 9B, at 932, the client module 102 retrieves the ciphertext data 810 from the data storage unit 116. At 934, the client module decrypts the encrypted ciphertext data 810 using the content symmetric key 804 to obtain the original unencrypted plaintext data 808.

Once the ciphertext data 810 is decrypted into plaintext data 808 the client module 102 and, more specifically, the application module(s) 114 in communication with the client module 102 can display, process, review, analyze, and/or modify the plaintext data 808. In the event the plaintext data 808 is modified, it can be encrypted again using the process discussed above with respect to FIG. 8 and stored in the data storage unit 116. In the event the plaintext data 808 is not modified, the client module 102 can simply discard the plaintext data 808 while an encrypted copy of the plaintext data, i.e., the ciphertext data 810, remains securely stored in the data storage.

In this way, the ECM system 10 of the present disclosure allows a member of a group to retrieve and decrypt the necessary keys to access and decrypt that group's encrypted ciphertext data 810, based on unique knowledge known only to the member of the group that is not stored anywhere in the ECM module 100 or ECM storage unit 112 and that is not known to any administrator or other user of the ECM system 10.

In other features, the ECM systems and methods of the present disclosure can enable the storage of multiple different encrypted versions of plaintext for additional protection and enforcement of need-to-know security policies.

In other features, code for the client module 102 is provided by the ECM module 100 over a network to the application module 114. In other features, the code for the client module 102, and the client module itself, are secured and protected from modification by the application module 114. In other features, the unique information known only to the user can be provided directly to the client module 102 without first being received by the application module 114. Alternatively, the unique information can be first received by the application module 114 and then communicated to the client module 102.

In other features, the client module 102 can be configured to directly display the decrypted plaintext data 508 on a display device of the client device 300 such that the application module 114 is prohibited from accessing the decrypted plaintext data 508.

In other features, the ECM module can revoke access to locally stored data and keys by refusing requests from the client module 102 to provide keys.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method comprising:

generating, with a client module, an asymmetric key pair for a user, including a user private key and a user public key;

generating, with the client module, a symmetric encryption key for the user, the symmetric encryption key being generated based on unique information known to the user;

encrypting, with the client module, the user private key using the symmetric encryption key to generate a user escrow key;

transmitting, with the client module, the user public key and the user escrow key to an encrypted content management module over a network, the encrypted content management module storing the user public key and the user escrow key in an encrypted content management storage unit;

generating, with the client module, a group asymmetric key pair including a group private key and a group public key;

generating, with the client module, a group symmetric encryption key;

encrypting, with the client module, the group private key with the group symmetric encryption key;

generating, with the client module, a first shared-secret key based on the user public key and the group private key using a diffie-hellman exchange algorithm;

encrypting, with the client module, the group symmetric encryption key using the first shared-secret key to generate a group escrow key;

communicating, with the client module, the group public key, the encrypted group private key, and the group escrow key to the encrypted content management module, the encrypted content management module storing the group public key, the encrypted group private key, and the group escrow key in the encrypted content management storage unit;

encrypting, with the client module, plaintext data into ciphertext data using a content symmetric key;

storing, with the client module, the ciphertext data in a data storage unit;

generating, with the client module, an ephemeral pair of keys including an ephemeral public key and an ephemeral private key;

receiving, with the client module, the group public key from the encrypted content management module;

generating, with the client module, a second shared-secret key based on the ephemeral private key and the group public key using a diffie-hellman exchange algorithm;

encrypting, with the client module, the content symmetric key using the second shared-secret key; and communicating, with the client module, the encrypted content symmetric key and the ephemeral public key to the encrypted content management module, the encrypted content management module storing the encrypted content symmetric key and the ephemeral public key in the encrypted content management storage unit.

2. The method of claim 1, further comprising:

requesting and receiving, with the client module, the user escrow key from the encrypted content management module;

generating, with the client module, the symmetric encryption key based on the unique information known to the user;

decrypting, with the client module, the user escrow key with the symmetric encryption key to obtain the user private key;

requesting and receiving, with the client module, the group public key from the encrypted content management module;

generating, with the client module, the first shared-secret key based on the user private key and the group public key;

requesting and receiving, with the client module, the group escrow key from the encrypted content management module;

decrypting, with the client module, the group escrow key using the first shared-secret key to recover the group symmetric encryption key;

requesting and receiving, with the client module, the encrypted group private key from the encrypted content management module;

decrypting, with the client module, the encrypted group private key using the group symmetric encryption key to recover the decrypted group private key;

requesting and receiving, with the client module, the encrypted content symmetric key and the ephemeral public key from the encrypted content management module;

generating, with the client module, the second shared-secret key based on the ephemeral public key and the decrypted group private key;

decrypting the encrypted content symmetric key using the second shared-secret key;

retrieving the ciphertext data from the data storage unit; and decrypting the ciphertext data using the decrypted content symmetric key to obtain the plaintext data.

3. The method of claim 1, wherein the unique information known to the user is a password.

4. The method of claim 1, wherein the unique information known to the user is stored on cryptographic hardware that is in the possession of the user.

5. The method of claim 4, wherein the cryptographic hardware is at least one of a smart card and a hardware token.

6. A system comprising:

a computer processor;

a client module executing on the computer processor and configured to:

generate an asymmetric key pair for a user, including a user private key and a user public key;

generate a symmetric encryption key for the user, the symmetric encryption key being generated based on unique information known to the user;

encrypt the user private key using the symmetric encryption key to generate a user escrow key;

transmit the user public key and the user escrow key to an encrypted content management module executing on a processor, over a network, the encrypted content management module storing the user public key and the user escrow key in an encrypted content management storage unit;

generate a group asymmetric key pair including a group private key and a group public key;

generate a group symmetric encryption key;

encrypt the group private key with the group symmetric encryption key;

generate a first shared-secret key based on the user public key and the group private key using a diffie-hellman exchange algorithm;

encrypt the group symmetric encryption key using the first shared-secret key to generate a group escrow key;

communicate the group public key, the encrypted group private key, and the group escrow key to the encrypted content management module, the encrypted content management module storing the group public key, the encrypted group private key, and the group escrow key in the encrypted content management storage unit;

encrypt plaintext data into ciphertext data using a content symmetric key;

store the ciphertext data in a data storage unit;

generate an ephemeral pair of keys including an ephemeral public key and an ephemeral private key;

receive the group public key from the encrypted content management module;

generate a second shared-secret key based on the ephemeral private key and the group public key using a diffie-hellman exchange algorithm;

encrypt the content symmetric key using the second shared-secret key; and communicate the encrypted content symmetric key and the ephemeral public key to the encrypted content management module, the encrypted content management module storing the encrypted content symmetric key and the ephemeral public key in the encrypted content management storage unit.

7. The system of claim 6, wherein:

the client module is further configured to:

request and receive the user escrow key from the encrypted content management module;

generate the symmetric encryption key based on the unique information known to the user;

decrypt the user escrow key with the symmetric encryption key to obtain the user private key;

generate the first shared-secret key based on the user private key and the group public key;

request and receive the group escrow key from the encrypted content management module;

decrypt the group escrow key using the first shared-secret key to recover the group symmetric encryption key;

request and receive the encrypted group private key from the encrypted content management module;

decrypt the encrypted group private key using the group symmetric encryption key to recover the decrypted group private key;

request and receive the encrypted content symmetric key and the ephemeral public key from the encrypted content management module;

generate the second shared-secret key based on the ephemeral public key and the decrypted group private key;

decrypt the encrypted content symmetric key using the second shared-secret key;

retrieve the ciphertext data from the data storage unit; and decrypt the ciphertext data using the decrypted content symmetric key to obtain the plaintext data.

8. The system of claim 6, wherein the unique information known to the user is a password.

9. The system of claim 6, wherein the unique information known to the user is stored on cryptographic hardware that is in the possession of the user.

10. The system of claim 9, wherein the cryptographic hardware is at least one of a smart card and a hardware token.

* * * * *